United States Patent
Okuyama et al.

(10) Patent No.: US 10,625,897 B2
(45) Date of Patent: Apr. 21, 2020

(54) SYNTHETIC RESIN CONTAINER AND MANUFACTURING METHOD THEREFOR

(71) Applicants: Yuichi Okuyama, Tokyo (JP); Kazuhiko Shimizu, Tokyo (JP)

(72) Inventors: Yuichi Okuyama, Tokyo (JP); Kazuhiko Shimizu, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 66 days.

(21) Appl. No.: 15/769,020

(22) PCT Filed: Sep. 1, 2016

(86) PCT No.: PCT/JP2016/004001
§ 371 (c)(1),
(2) Date: Apr. 17, 2018

(87) PCT Pub. No.: WO2017/072997
PCT Pub. Date: May 4, 2017

(65) Prior Publication Data
US 2019/0077535 A1   Mar. 14, 2019

(30) Foreign Application Priority Data
Oct. 29, 2015   (JP) .................................. 2015-213342

(51) Int. Cl.
*B65D 1/02*       (2006.01)
*B29C 49/08*      (2006.01)
(Continued)

(52) U.S. Cl.
CPC .............. *B65D 1/023* (2013.01); *B29C 49/08* (2013.01); *B29C 49/46* (2013.01); *B29C 49/78* (2013.01);
(Continued)

(58) Field of Classification Search
CPC .. B65D 1/023; B65D 1/02; B29C 2049/4652; B29K 2067/003
(Continued)

(56) References Cited

U.S. PATENT DOCUMENTS 5,191,987 A * 3/1993 Niimi ................... B65D 1/0207
                                                    215/379
2005/0263481 A1* 12/2005 Tanaka ................. B65D 1/0223
                                                    215/381
(Continued)

FOREIGN PATENT DOCUMENTS

JP   2007-119016 A   5/2007
JP   2008-056305 A   3/2008
(Continued)

OTHER PUBLICATIONS

Jun. 26, 2018 Notification issued in Japanese Patent Application No. 2015-213342.
(Continued)

*Primary Examiner* — Anthony D Stashick
*Assistant Examiner* — Raven Collins
(74) *Attorney, Agent, or Firm* — Oliff PLC

(57) ABSTRACT

A synthetic resin container having a bottle shape including a tube-shaped mouth, a tube-shaped trunk having one end closed by a bottom, and a shoulder through which another end of the trunk is connected to the mouth. The shoulder is inclined at an angle greater than 120° with respect to an axis of the mouth, and the shoulder has a crystal orientation in a machine direction of less than 1.

8 Claims, 2 Drawing Sheets

(51) Int. Cl.
  *B29C 49/00* (2006.01)
  *B29K 67/00* (2006.01)
  *B29L 31/00* (2006.01)
  *B29C 49/46* (2006.01)
  *B29C 49/78* (2006.01)
(52) U.S. Cl.
  CPC ............ *B65D 1/02* (2013.01); *B65D 1/0207* (2013.01); *B29C 49/0005* (2013.01); *B29C 2049/465* (2013.01); *B29C 2049/4652* (2013.01); *B29K 2067/003* (2013.01); *B29L 2031/7158* (2013.01)
(58) Field of Classification Search
  USPC ........................................................ 215/40
  See application file for complete search history.

(56) References Cited

U.S. PATENT DOCUMENTS

| | | | |
|---|---|---|---|
| 2014/0183156 A1* | 7/2014 | Hanan .................. | B65D 1/0284 215/382 |
| 2014/0265054 A1 | 9/2014 | Kumar et al. | |
| 2014/0356475 A1 | 12/2014 | Sato et al. | |
| 2015/0110915 A1 | 4/2015 | Tamura et al. | |
| 2015/0183150 A1 | 7/2015 | Chauvin et al. | |

FOREIGN PATENT DOCUMENTS

| | | |
|---|---|---|
| JP | 2009-262989 A | 11/2009 |
| JP | 2010-036942 A | 2/2010 |
| JP | 2013-154603 A | 8/2013 |
| JP | 2013-208839 A | 10/2013 |
| JP | 2013-248748 A | 12/2013 |
| JP | 2014-234162 A | 12/2014 |

OTHER PUBLICATIONS

May 1, 2018 International Preliminary Report on Patentability issued in International Patent Application No. PCT/JP2016/004001.
Nov. 29, 2016 International Search Report issued in International Patent Application No. PCT/JP2016/004001.
Feb. 1, 2019 Office Action issued in Canadian Patent Application No. 3,003,117.
Apr. 24, 2019 Extended Search Report issued in European Patent Application No. 16859238.4.
Jul. 2, 2019 Office Action issued in Japanese Patent Application No. 2015-213342.
Nov. 28, 2019 Office Action issued in Canadian Patent Application No. 3,003,117.

\* cited by examiner

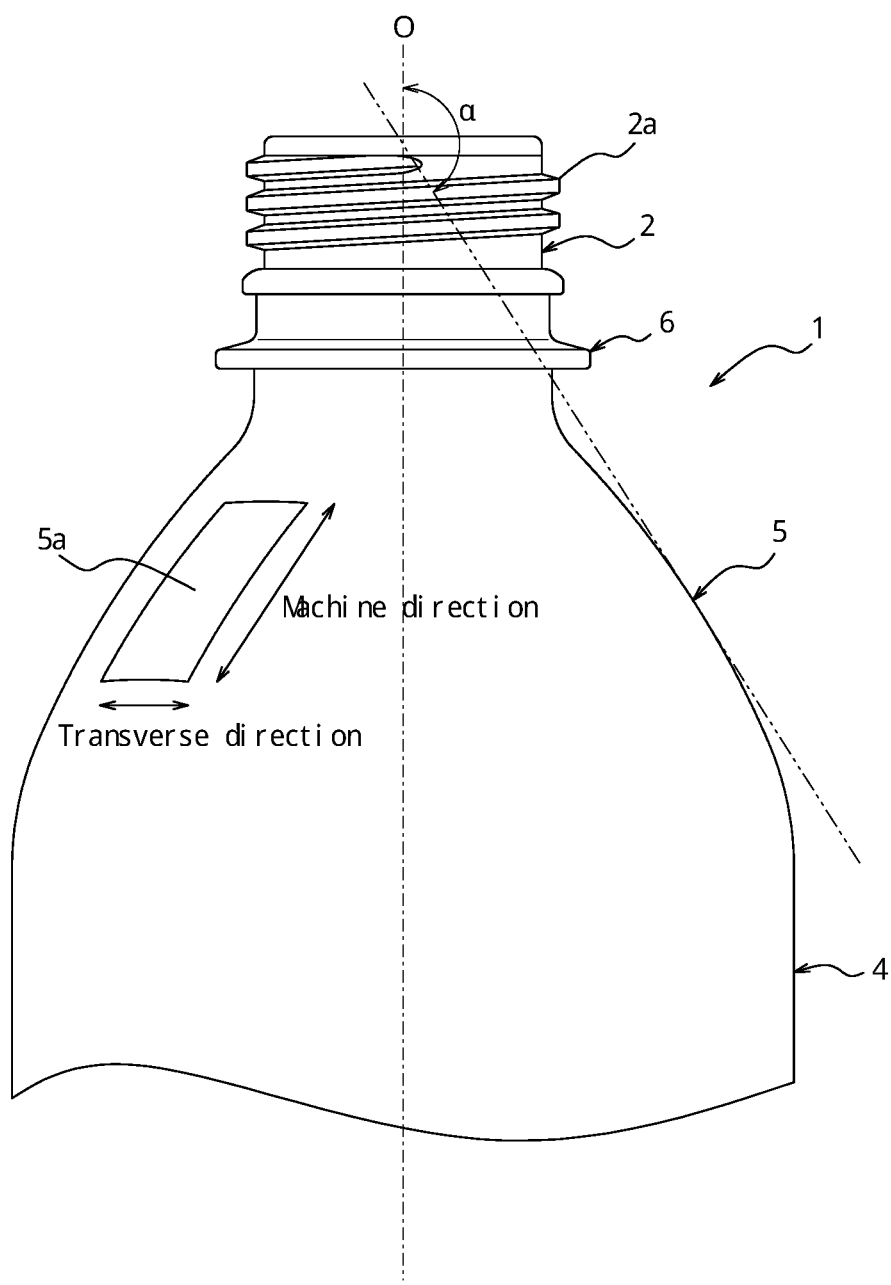

SYNTHETIC RESIN CONTAINER AND MANUFACTURING METHOD THEREFOR

TECHNICAL FIELD

The present disclosure relates to a synthetic resin container having a bottle shape including a tube-shaped mouth, a tube-shaped trunk having one end closed by a bottom, and a shoulder through which another end of the trunk is connected to the mouth, and the present disclosure also relates to a method of producing the synthetic resin container.

BACKGROUND

Synthetic resin containers (e.g., PET bottles) having a bottle shape including a tube-shaped mouth, a tube-shaped trunk having one end closed by a bottom, and a shoulder through which another end of the trunk is connected to the mouth have been widely used as containers used to contain a variety of content liquids, such as a seasoning including soy sauce, a beverage, a cosmetic product, shampoo, and a liquid detergent.

Such a synthetic resin container is generally produced by blow molding a preform by using pressurized air. The preform has been formed by thermoplastic resin in a bottomed tubular shape. Patent Literature 1, for example, describes a synthetic resin container produced by subjecting a bottomed tubular-shaped preform to biaxial stretch blow molding using pressurized air to stretch portions of the preform that correspond to the shoulder, the trunk, and the bottom in the axial and radial directions into a predetermined bottle shape.

CITATION LIST

Patent Literature

PTL 1: JP2008056305A

SUMMARY

Technical Problem

In the aforementioned synthetic resin container having the bottle shape, the shoulder often has, for example, a substantially frustoconical shape that is inclined with respect to an axis of the mouth.

However, in the biaxially stretch-blow-molded synthetic resin container, an increase in inclination angle of the shoulder with respect to the axis of the mouth means an increase in draw ratio in the machine direction of the portion of the preform that corresponds to the shoulder during blow molding in accordance with the increase in inclination angle. Accordingly, when the container has a shape in which the shoulder is significantly inclined with respect to the axis direction of the mouth, the shoulder, even with the same crystallinity, tends to undergo contraction after molding. Especially when the container has a shape in which the shoulder is inclined at an angle greater than 120° with respect to the axis of the mouth, the degree of contraction of the shoulder after molding increases, and this may cause a problem such as a decrease in volume of the container and deformation of the container.

The present disclosure has been conceived in view of the above problem, and the present disclosure is to provide a synthetic resin container and a method of producing the synthetic resin container both of which prevent the decrease in volume and deformation by reducing the degree of contraction of the shoulder while allowing the shape in which the shoulder is inclined at an angle of greater than 120° with respect to the axis of the mouth.

Solution to Problem

One of aspects of the present disclosure resides in a synthetic resin container having a bottle shape including a tube-shaped mouth, a tube-shaped trunk having one end closed by a bottom, and a shoulder through which another end of the trunk is connected to the mouth, wherein the shoulder is inclined at an angle greater than 120° with respect to an axis of the mouth, and the shoulder has a crystal orientation in a machine direction of less than 1.

In the presently disclosed synthetic resin container with the above configuration, the mouth may be formed in a substantially cylindrical shape, the trunk may be formed in a substantially cylindrical shape having a diameter greater than a diameter of the mouth, and the shoulder may be formed in a substantially frustoconical shape.

The presently disclosed synthetic resin container with the above configuration may be made of polyethylene terephthalate.

Another aspect of the present disclosure resides in a method of producing the presently disclosed synthetic resin container as described above, the method including supplying, to a preform that has been formed by thermoplastic resin in a bottomed tubular shape, a liquid heated to a predetermined temperature at a predetermined pressure to liquid blow mold the preform.

Advantageous Effect

The present disclosure provides a synthetic resin container and a method of producing the synthetic resin container both of which prevent the decrease in volume and deformation by reducing the degree of contraction of the shoulder while allowing the shape in which the shoulder is inclined at an angle greater than 120° with respect to the axis of the mouth.

BRIEF DESCRIPTION OF THE DRAWINGS

In the accompanying drawings:

FIG. 2 illustrates a portion from which a specimen is cut out and an inclination angle of a shoulder with respect to an axis of a mouth.

DETAILED DESCRIPTION

Figure 1:
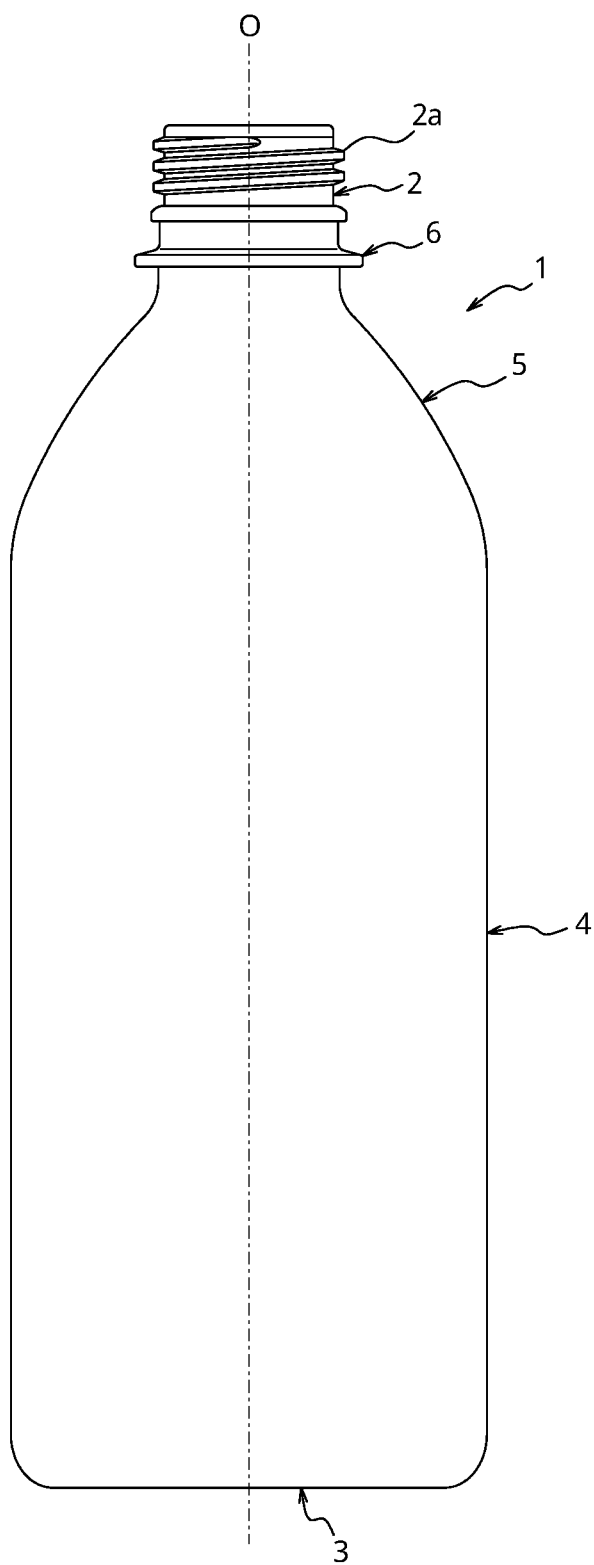
FIG. 1 is a front view of an example of a synthetic resin container according to one of embodiments of the present disclosure.

A synthetic resin container and a method of producing the same according to some of embodiments of the present disclosure are described by illustration in more detail below with reference to the drawings.

The presently disclosed synthetic resin container has a bottle shape including a tube-shaped mouth, a tube-shaped trunk having one end closed by a bottom, and a shoulder through which another end of the trunk is connected to the mouth, wherein the shoulder is inclined at an angle greater than 120° with respect to an axis of the mouth, and the shoulder has a crystal orientation in a machine direction of less than 1. The presently disclosed synthetic resin container may be used as a container to contain a variety of content liquids, such as a beverage, a seasoning including soy sauce, a cosmetic product, shampoo, and a liquid detergent. A synthetic resin container 1 according to one of embodiments of the present disclosure is illustrated in FIG. 1.

The synthetic resin container 1 illustrated in FIG. 1 may be used to contain a beverage, such as a juice drink and tea, and has a volume of 500 ml. The synthetic resin container 1 has a bottle shape having a substantially cylindrical-shaped mouth 2, a substantially cylindrical-shaped trunk 4 having one end closed by a bottom 3, and a shoulder 5 through which another end of the trunk 4 is connected to the mouth 2.

The synthetic resin container 1 may be made of polyethylene terephthalate (PET). That is to say, the synthetic resin container 1 may be configured as a PET bottle.

The mouth 2 is configured to be attached with a cap (which is not illustrated) to close the mouth 2. In the illustrated case, the mouth 2 is provided, on an outer circumferential surface thereof, with a screw thread 2a, to which the cap may be screw-connected to close the mouth 2. The mouth 2 is also provided, in a lower portion thereof, integrally with a neck ring 6.

The mouth 2 does not necessarily need to be provided with the screw thread 2a and may be provided with an annular projection, instead of the screw thread 2a, and the a cap having an undercut shape may be fixed to the mouth 2 by plugging. In this case, the shape of the mouth 2 is not limited to the cylindrical shape, and the mouth 2 may be formed in a variety of tubular shapes, such as a square tubular shape and an ellipsoidal tubular shape.

The trunk 4 is formed in a substantially cylindrical shape having a diameter greater than a diameter of the mouth 2 and has an axis aligned with the axis O of the mouth 2. In the illustrated case, the trunk 4 is formed in the substantially cylindrical shape having an even outer circumferential surface. However, the trunk 4 may have a variety of uneven configurations, such as a plurality of reduced pressure absorbing panels configured to absorb reduced pressure generated inside the synthetic resin container 1 after the mouth 2 is closed with the cap, as well as annular concave ribs configured to enhance rigidity.

The shoulder 5 is formed in a substantially frustoconical shape having a diameter gradually increased toward the outer side in the radial direction from the side of the mouth 2 to the trunk 4, and the shoulder 5 is inclined with respect to the axis O of the mouth 2. An upper end of the shoulder 5 overlaps integrally with a lower end of the mouth 2, and a lower end of the shoulder 5 overlaps integrally with an upper end of the trunk 4.

The synthetic resin container 1 may be produced by a method of producing the synthetic resin container according to one of embodiments of the present disclosure, that is, by liquid blow molding a preform (which is not illustrated) that has been formed by thermoplastic resin (e.g., polyethylene terephthalate) in a bottomed tubular shape (i.e., substantially test tube shape).

More concretely, the synthetic resin container 1 may be produced by heating the preform that has been formed by thermoplastic resin in the bottomed tubular shape to a predetermined temperature at which stretchability may be achieved and by supplying, to the heated preform, a liquid heated to a predetermined temperature at a predetermined pressure to biaxially stretch blow mold the heated preform. In this case, as the liquid used as a pressurizing medium during liquid blow molding, the content liquid, such as a beverage, that is to be contained in the synthetic resin container 1 as a final product may be used. By doing so, the process of filling the content liquid to the synthetic resin container 1 after molding may be omitted, and the manufacturing process and the configuration of a manufacturing apparatus may be simplified.

As illustrated in FIG. 2, in the synthetic resin container 1, the shoulder 5 is inclined at an angle greater than 120° with respect to the axis O of the mouth 2. In the illustrated case, the shoulder 5 is inclined at an angle α of 150° with respect to the axis O of the mouth 2. Additionally, when the shoulder 5 is shaped to slightly curve in a protruding manner toward the outer side in the radial direction between the mouth 2 and the trunk 4 as illustrated, the angle α that the shoulder 5 forms with respect to the axis O of the mouth 2 may be defined as an average value of angles that a plurality of portions of the shoulder 5 in the machine direction forms with respect to the axis O.

Furthermore, in the synthetic resin container 1, the shoulder 5 has a crystal orientation in the longitudinal direction (machine direction: MD) of less than 1. In the illustrated case, the crystal orientation of the shoulder 5 in the machine direction is 0.843.

The aforementioned crystal orientation of the shoulder 5 is calculated as follows. That is to say, a portion of the shoulder 5 is cut out as a specimen 5a (refer to FIG. 2), and an IR spectrum of the container inner surface side of the specimen 5a in the longitudinal direction (MD) is measured by the attenuated total reflectance method, and the crystal orientation is calculated from the formula A1/A2, where A1 is an absorbance around a wave-number v1=1340 $cm^{-1}$ in the obtained IR spectrum, and A2 is an absorbance around a wave-number v2=1410 $cm^{-1}$ in the obtained IR spectrum. In the aforementioned attenuated total reflectance method, infrared light (vertically polarized light [0° polarizing plate]) is emitted to the specimen 5a through the polarizing plate at an incidence angle of 30° from a direction perpendicular to the longitudinal direction (MD), and germanium (Ge) having a refractive index of 4.0 is used as an internal reflection element for measurement, and "FT-IR system 2000" manufactured by PerkinElmer, Inc. is used as a measuring machine. Note that the machine direction of the crystal orientation in the shoulder 5 refers to a direction that is perpendicular to the transverse direction centered about the axis O of the mouth 2 and that extends along an outer surface of the shoulder 5.

In this way, in the presently disclosed synthetic resin container 1 having the bottle shape, the shoulder 5 is inclined at an angle greater than 120° with respect to the axis O of the mouth 2, and the crystal orientation of the shoulder 5 in the machine direction is less than 1. Accordingly, even when the synthetic resin container 1 is molded by biaxial stretch blow molding, the degree of contraction of the shoulder 5 after molding is reduced while allowing the shoulder 5 to be inclined at an angle greater than 120° with respect to the axis O of the mouth 2. This prevents a decrease in volume of the synthetic resin container 1 and deformation of the synthetic resin container 1 after molding.

Examples

As Examples 1 to 3 of the present disclosure, a bottle-shaped synthetic resin container (Example 1) in which the angle α that the shoulder forms with respect to the axis of the mouth was 140° and in which the crystal orientation in the machine direction of the shoulder was 0.799, a bottle-shaped synthetic resin container (Example 2) in which the angle α that the shoulder forms with respect to the axis of the mouth was 145° and in which the crystal orientation in the machine direction of the shoulder was 0.788, and a bottle-shaped synthetic resin container (Example 3) in which the angle α that the shoulder forms with respect to the axis of the mouth was 150° and in which the crystal orientation in the machine direction of the shoulder was 0.843 were prepared. These synthetic resin containers of Examples 1 to 3 were each formed by liquid blow molding a preform that had been formed by thermoplastic resin in a bottomed tubular shape.

As Comparative Examples 1 to 6 of the present disclosure, a bottle-shaped synthetic resin container (Comparative Example 1) in which the angle α that the shoulder forms with respect to the axis of the mouth was 140° and in which the crystal orientation in the machine direction of the shoulder was 1.264, a bottle-shaped synthetic resin container (Comparative Example 2) in which the angle α that the shoulder forms with respect to the axis of the mouth was 145° and in which the crystal orientation in the machine direction of the shoulder was 1.327, a bottle-shaped synthetic resin container (Comparative Example 3) in which the angle α that the shoulder forms with respect to the axis of the mouth was 150° and in which the crystal orientation in the machine direction of the shoulder was 1.240, a bottle-shaped synthetic resin container (Comparative Example 4) in which the angle α that the shoulder forms with respect to the axis of the mouth was 95° and in which the crystal orientation in the machine direction of the shoulder was 0.520, a bottle-shaped synthetic resin container (Comparative Example 5) in which the angle α that the shoulder forms with respect to the axis of the mouth was 100° and in which the crystal orientation in the machine direction of the shoulder was 0.265, a bottle-shaped synthetic resin container (Comparative Example 6) in which the angle α that the shoulder forms with respect to the axis of the mouth was 115° and in which the crystal orientation in the machine direction of the shoulder was 0.516, a bottle-shaped synthetic resin container (Comparative Example 7) in which the angle α that the shoulder forms with respect to the axis of the mouth was 120° and in which the crystal orientation in the machine direction of the shoulder was 0.353, a bottle-shaped synthetic resin container (Comparative Example 8) in which the angle α that the shoulder forms with respect to the axis of the mouth was 95° and in which the crystal orientation in the machine direction of the shoulder was 0.264, and a bottle-shaped synthetic resin container (Comparative Example 9) in which the angle α that the shoulder forms with respect to the axis of the mouth was 100° and in which the crystal orientation in the machine direction of the shoulder was 0.210 were prepared. The synthetic resin containers of Comparative Examples 1 to 7 were each formed by air blow molding a preform that had been formed by thermoplastic resin in a bottomed tubular shape. The synthetic resin containers of Comparative Examples 8 and 9 were each formed by liquid blow molding a preform that had been formed by thermoplastic resin in a bottomed tubular shape.

For each of the 12 synthetic resin containers of Examples 1 to 3 and Comparative Examples 1 to 9, the presence of contraction of the shoulder when a predetermined period elapsed after the synthetic resin container was molded (a change over time) was assessed. The contraction of the shoulder was assessed as "absent" when the temperature at which the contraction of the shoulder started was greater than or equal to 84.5° C. and assessed as "present" when the temperature at which the contraction of the shoulder started was less than 84.5° C. according to measurement using the thermo-mechanical analyzer "EXSTAR6000" manufactured by SIT Nano Technology Inc. The assessment result is depicted in Table 1.

TABLE 1

| | Angle α (°) | Crystal orientation | Presence of contraction |
|---|---|---|---|
| Example 1 | 140 | 0.799 | Absent |
| Example 2 | 145 | 0.788 | Absent |
| Example 3 | 150 | 0.843 | Absent |
| Comparative Example 1 | 140 | 1.264 | Present |
| Comparative Example 2 | 145 | 1.327 | Present |
| Comparative Example 3 | 150 | 1.240 | Present |
| Comparative Example 4 | 95 | 0.520 | Absent |
| Comparative Example 5 | 100 | 0.265 | Absest |
| Comparative Example 6 | 115 | 0.516 | Absent |
| Comparative Example 7 | 120 | 0.353 | Absent |
| Comparative Example 8 | 95 | 0.264 | Absent |
| Comparative Example 9 | 100 | 0.210 | Absent |

As depicted in Table 1, the synthetic resin containers of Examples 1 to 3, in which the angle α that the shoulder forms with respect to the axis of the mouth was greater than 120° and in which the crystal orientation in the machine direction of the shoulder was less than 1, did not exhibit contraction of the shoulder.

On the other hand, each of the synthetic resin containers of Comparative Examples 1 to 3, in which the angle α that the shoulder forms with respect to the axis of the mouth was greater than 120° and in which the crystal orientation in the machine direction of the shoulder was greater than or equal to 1, exhibited contraction of the shoulder, and this might cause a decrease in volume and deformation of the synthetic resin container.

From the above result, it has been confirmed that setting the crystal orientation in the machine direction of the shoulder to be less than 1 as in the synthetic resin containers of the present disclosure reduces the degree of contraction of the shoulder and prevents the decrease in volume and deformation even when the shoulder is inclined at an angle greater than 120° with respect to the axis of the mouth.

On the other hand, as can be understood, regarding the synthetic resin containers of Comparative Examples 1 to 7, which were each formed by air blow molding the preform that had been formed by thermoplastic resin in the bottomed tubular shape, the crystal orientation in the machine direction of the shoulder is less than 1 when the angle α of the shoulder is less than or equal to 120°, whereas the crystal orientation in the machine direction of the shoulder is greater than or equal to 1 when the angle α of the shoulder is greater than 120°, thereby causing contraction of the shoulder.

In contrast, as can be understood, regarding the synthetic resin containers of Examples 1 to 3 and Comparative Examples 8 and 9, which were each formed by liquid blow molding the preform that had been formed by thermoplastic resin in the bottomed tubular shape, the crystal orientation in the machine direction of the shoulder is maintained to be less than 1 even when the angle α of the shoulder is greater than 120° and, needless to say, when the angle α of the shoulder is less than or equal to 120°, thereby preventing the occurrence of contraction of the shoulder.

From the above result, it has been understood that the presently disclosed synthetic resin container in which the angle α that the shoulder forms with respect to the axis of the mouth is greater than 120° and in which the crystal orientation in the machine direction of the shoulder is less than 1 may be easily produced by liquid blow molding a preform that has been formed by thermoplastic resin in a bottomed tubular shape into the synthetic resin container.

Needless to say, the present disclosure is not limited to the configurations described in the above embodiments, and various changes may be made without departing the gist thereof.

For example, although in the above embodiments the presently disclosed synthetic resin container 1 is illustrated to have the shape of FIG. 1, the synthetic resin container 1 only needs to have a bottle shape including a tube-shaped mouth, a tube-shaped trunk having one end closed by a bottom, and a shoulder through which another end of the trunk is connected to the mouth, and the shape, volume, or dimension of the synthetic resin container may be altered in various ways.

For example, although in the above embodiments the angle $\alpha$ that the shoulder 5 forms with respect to the axis O of the mouth 2 is 150°, the angle $\alpha$ may be set to various angles that are greater than 120°.

Furthermore, although in the above embodiments the crystal orientation in the machine direction of the shoulder 5 is 0.843, the present disclosure is not limited to the embodiments. The crystal orientation only needs to be less than 1 and may be altered in various ways. Additionally, the crystal orientation of the shoulder 5 may be set to be in the above range by altering conditions, such as the shape of the preform, draw ratios of the preform during biaxial stretch blow molding in the machine and transverse directions, the heating temperature of the preform, the temperature of the liquid supplied, the temperature of the mold, and a blow time period, in various ways.

Moreover, although in the above embodiments the shoulder 5 has the substantially frustoconical shape, the present disclosure is not limited to the embodiments. The shoulder 5 may be formed for example in a substantially dome shape that curves in a protruding manner toward the outer side in the radial direction between the mouth 2 and the trunk 4. In this case also, the angle $\alpha$ that the shoulder 5 forms with respect to the axis O of the mouth 2 may be defined as an average value of angles that a plurality of portions of the substantially dome-shaped shoulder 5 in the machine direction forms with respect to the axis O.

Moreover, although in the above embodiments the presently disclosed synthetic resin container 1 is made of polyethylene terephthalate, the present disclosure is not limited to the embodiments, and the synthetic resin container 1 may be made of another synthetic resin material.

Moreover, the presently disclosed synthetic resin container does not necessarily need to be formed by liquid blow molding the preform, and the present disclosure may be applied to a synthetic resin container formed by air blowing a preform or by subjecting a parison to direct blow molding (extrusion blow molding).

REFERENCE SIGNS LIST

1 Synthetic resin container
2 Mouth
2a Screw thread
3 Bottom
4 Trunk
5 Shoulder
6 Neck
$\alpha$ Angle

The invention claimed is:

1. A synthetic resin container having a bottle shape including a tube-shaped mouth, a tube-shaped trunk having one end closed by a bottom, and a shoulder through which another end of the trunk is connected to the mouth, wherein the shoulder is inclined at an angle less than 60° with respect to the center axis of the mouth, and the shoulder has a crystal orientation in a machine direction of greater than 0.788 and less than 1.

2. The synthetic resin container of claim 1, wherein the mouth is formed in a substantially cylindrical shape, the trunk is formed in a substantially cylindrical shape having a diameter greater than a diameter of the mouth, and the shoulder is formed in a substantially frustoconical shape.

3. The synthetic resin container of claim 1 made of polyethylene terephthalate.

4. A method of producing the synthetic resin container of claim 1, the method comprising supplying, to a preform that has been formed by thermoplastic resin in a bottomed tubular shape, a liquid heated to a predetermined temperature at a predetermined pressure to liquid blow mold the preform.

5. The synthetic resin container of claim 2 made of polyethylene terephthalate.

6. A method of producing the synthetic resin container of claim 2, the method comprising supplying, to a preform that has been formed by thermoplastic resin in a bottomed tubular shape, a liquid heated to a predetermined temperature at a predetermined pressure to liquid blow mold the preform.

7. A method of producing the synthetic resin container of claim 3, the method comprising supplying, to a preform that has been formed by thermoplastic resin in a bottomed tubular shape, a liquid heated to a predetermined temperature at a predetermined pressure to liquid blow mold the preform.

8. A method of producing the synthetic resin container of claim 5, the method comprising supplying, to a preform that has been formed by thermoplastic resin in a bottomed tubular shape, a liquid heated to a predetermined temperature at a predetermined pressure to liquid blow mold the preform.

* * * * *